United States Patent [19]

Romanowski

[11] 4,092,864
[45] June 6, 1978

[54] HOT SPOT THERMOMETER

[75] Inventor: Robert F. Romanowski, Rochester, N.Y.

[73] Assignee: Qualitrol Corporation, Fairport, N.Y.

[21] Appl. No.: 711,538

[22] Filed: Aug. 4, 1976

[51] Int. Cl.² ............................................. G01K 5/48
[52] U.S. Cl. ........................................ 73/363; 73/349; 73/350; 73/357
[58] Field of Search .................. 73/349, 350, 357, 363

[56] References Cited
U.S. PATENT DOCUMENTS

| 2,374,055 | 4/1945 | Treanor | 73/350 X |
| 3,540,650 | 11/1970 | Boekelman et al. | 73/363 X |
| 3,960,017 | 6/1976 | Romanowski | 73/350 X |

Primary Examiner—Richard C. Queisser
Assistant Examiner—Charles Gorenstein
Attorney, Agent, or Firm—Stephen J. Rudy

[57] ABSTRACT

A thermometer unit for monitoring the temperature of a fluid cooled electric transformer, the unit having a ceramic body insertable between the coils of the transformer winding immersed in cooling fluid in the transformer case. A nylon element responsive to heat changes is confined in the interior of the body and is adapted to expand according to developing heat changes. A flexible tubing having a loop portion fronting a tapered end of the nylon element is filled with a fluid which is caused to oscillate in the tubing accordingly as a rocker arm alternate actuates a pair of associated bellows. As the nylon element expands in response to a temperature rise, it squeezes the tubing causing a load to be placed upon the rocker arm which is indicative of the corresponding temperature change.

6 Claims, 4 Drawing Figures

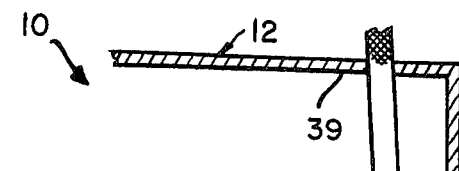
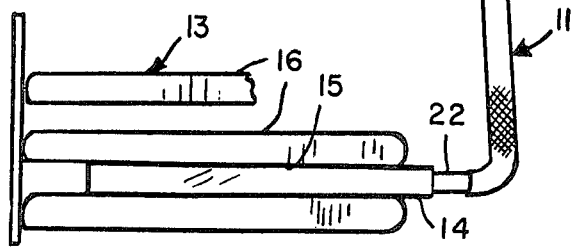
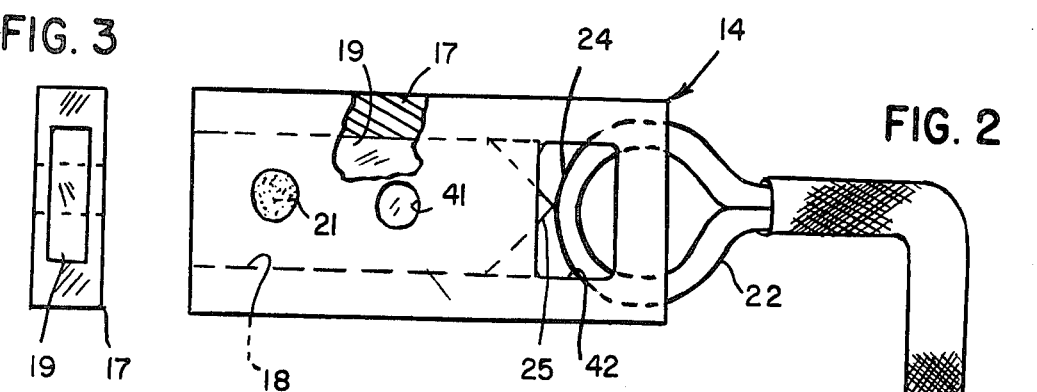
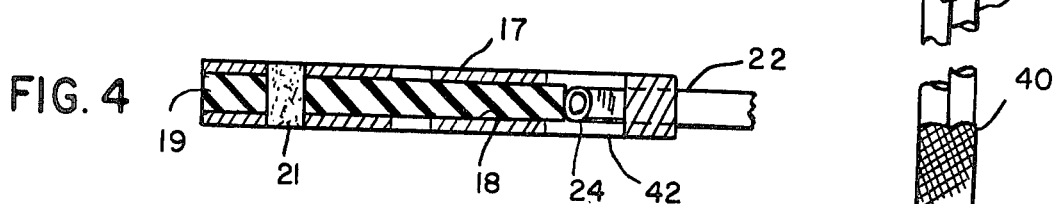
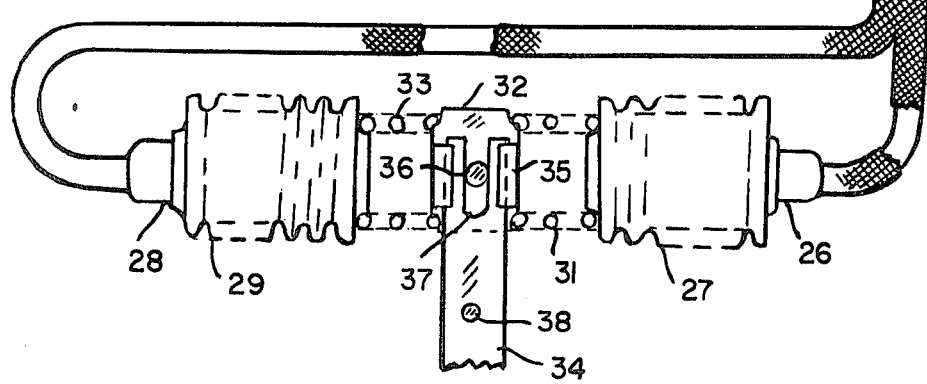

HOT SPOT THERMOMETER

BACKGROUND OF THE INVENTION

This invention relates to thermometers and it is particularly concerned with improvements in hot spot thermometers.

While a hot spot thermometer may have other applications, it is especially suited for use in sensing temperature changes in a fluid cooled electric transformer.

A hot spot thermometer is so named because of its structural characteristics whereby it is enabled to be located for temperature monitoring purposes at the spot of hottest temperature development in a transformer. This spot is between the coils of the transformer winding.

This type of thermometer has various advantages. Because it is applied to the hottest area of the transformer, it obtains not only a more accurate reading but also a more rapid indication of temperature changes than would otherwise be provided.

A hot spot theremometer is known from U.S. Pat. No. 3,960,017. It utilizes a high heat resistant ceramic body insertable between the coils of a transformer winding and containing a heat sensitive dielectric rod adapted to vary passage of light through fibre optic elements to produce in an external read-out instrument electrical signals indicative of temperature changes developing in the transformer.

An object of the present invention is to provide a hot spot thermometer which utilizes a high heat resistant ceramic body insertable between the coils of a transformer winding and containing a heat sensitive element which is cooperable with a bellows connected tubing containing a fluid oscillating in the tubing accordingly as the bellows are acted upon by a rocker arm to vary the pressure in the tubing in response to a predetermined temperature sensed.

In accordance with the invention, there is provided the combination comprising an electrical transformer apparatus having a tank containing cooling oil in which the coils of a transformer winding are immersed; and a hot spot thermometer unit having a ceramic body inserted into a space between the coils, a bellows connected to each of the ends of the tubing adapted to cause the fluid to oscillate about the tubing accordingly as one or the other of the bellows is actuated, a rocker arm cooperable with the bellows to alternately actuate one and then the other of the bellows, a loop formation in the tubing disposed in a recess in the body, a heat sensitive element arranged in the recess having a tapered end abutting the loop, the heat sensitive element adapted upon sensing a predetermined rise in temperature to expand its tapered end into squeezing, constricting relation with the tubing and causing as a consequence a rise in the pressure of the fluid as it is the tubing and a corresponding loading of the rocker arm.

BRIEF DESCRIPTION OF THE DRAWING

In the accompanying drawing:

FIG. 1 is a fragmentary picture view showing a hot spot thermometer unit embodying the invention as applied to the coil winding of a fluid cooled electric transformer;

FIG. 2 is a view of the thermometer unit apart from the transformer;

FIG. 3 is an elevational view of the rear end of the sensor member of the thermometer unit; and FIG. 4 is a longitudinal section through the sensor unit.

DESCRIPTION OF A PREFERRED EMBODIMENT OF THE INVENTION

In the drawing is disclosed a conventional fluid cooled high voltage transformer apparatus 10 to which a thermometer unit 11 embodying the invention has been applied. Only as much of the transformer apparatus has been shown as needed to provide a proper understanding of the invention and its mode of application.

The transformer apparatus includes the usual tank 12 containing cooling oil in which the transformer winding 13 is immersed. The thermometer unit 11 has been applied to the transformer by inserting a heat sensor member 14 thereof into one of the usual spaces 15 separating the coils 16 of the winding.

The sensor member 14 includes a flat ceramic dielectric body 17 having a recess 18 extending into its rear in which a non-metallic dielectric heat sensing element 19 is disposed. Here, the sensing element is formed of nylon plastics. It is fixed in its rear portion to the body by means of a plug of cement 21; and is loose in its forward portion. By means of this construction, the element 19 is enabled to expand or vary its linear dimension relative to the body according to the value of heat sensed.

A loop portion 22 of a flexible tubing 23 is confined in the rear portion of the body in such manner that a segment or arc 24 of the loop extends freely across the recess 18 forwardly of a tapered end or tip 25 of the sensing element.

One end of the tubing has a fluid tight or sealed connection to an outer end 26 of a bellows 27. An opposite end of the tubing has a similar connection to an outer end 28 of a second bellows 29.

The bellows are axially aligned with one another. A spring 31 fitted to an inner end of bellows 27 abuts one edge of a supporting plate 32. An opposite spring 33 similarly associates the second bellows 29 with the plate.

Plate 32 is slidably fitted over a slotted end of a rocker arm 34. A pair of opposed flanges 35 of the plate overlie a face of the rocker arm; and a pin 36 of the plate is received in the slot 37. The rocker arm in turn is pivoted upon a pin 38.

The tubing and bellows are filled with a suitable fluid, here oil. The tubing extends through a wall 39 of the transformer tank, and is connected with the bellows externally of the tank.

In summary of the use of the thermometer unit, the sensor member 14 thereof is inserted between the coils of the transformer winding as indicated in FIG. 1. It has a friction fit therein so as to retain its position. The rocker arm 34 is constantly being rocked back and forth about its pivot 38 by means of an associated motor (not shown). This rocking motion acts through plate 32 to compress alternately one bellows and then the other, causing the fluid in the tubing to oscillate back and forth. When the heat sensing element 19 is caused to expand linearly in response to a temperature rise in the transformer winding above a predetermined value, its tapered end pinches or squeezes the looped portion 24 of the tubing. This results in loading of the rocker arm and increase of internal pressure of the bellows. The extent of the loading as an indication of the degree of temperature rise in the transformer winding is indicated by a suitable associated read-out instrument (not shown).

The springs 31, 33 serve to take up slack that develops between the bellows as the rocker arm becomes loaded.

It is to be noted that the oil filled tubing and associated bellows requires only two connections, one for each end of the tubing with the bellows. This is of particular advantage in that the risk of fluid leakage from the system is reduced to a minimum.

Externally of the sensor element, the tubing is encased in a suitable jacket 40 to avoid expension of the tubing under the pressure created therein as a consequence of the squeezing action of the sensing element 19.

Cross openings 41, 42 extending through the body of the sensor unit serve to expose the heat sensing element 19 directly to the transformer fluid. This results in direct application to element 19 the heat developing in the fluid. This increases the rapidity of response of the element to a developing temperature change.

I claim:

1. The combination comprising an electrical transformer apparatus having a tank containing cooling oil in which the coils of a transformer winding are immersed, and a hot spot thermometer unit having a ceramic body inserted into a space between the coils, a flexible tubing filled with fluid, a bellows connected to each of the ends of the tubing adapted to cause the fluid to oscillate about the tubing accordingly as one or the other of the bellows is actuated, a rocker arm cooperable with the bellows to alternately actuate one and then the other of the bellows, a loop formation in the tubing disposed in a recess in the body, a heat sensitive element arranged in the recess having a tapered end abutting the loop, the heat sensitive element adapted upon sensing a predetermined rise in temperature to expand its tapered end into squeezing relation with the tubing and causing as a consequence a restriction in the flow of the fluid in the tubing and a corresponding loading of the rocker arm.

2. The combination as in claim 1, wherein the heat sensitive element is formed of nylon plastics.

3. The combination as in claim 1, wherein the tubing is encased in a jacket so as to prevent expansion of the tubing as a consequence of rise in pressure of the fluid.

4. A hot spot thermometer unit having a ceramic body, a flexible tubing filled with fluid, a bellows connected to each of the ends of the tubing adapted to cause the fluid to oscillate about the tubing accordingly as one or the other of the bellows is actuated, a rocker arm cooperable with the bellows to alternately actuate one and then the other of the bellows, a loop formation in the tubing disposed in a recess in the body, a heat sensitive element arranged in the recess having a tapered end abutting the loop, the heat sensitive element adapted upon sensing a predetermined pressure rise in temperature to expand its tapered end into squeezing relation with the tubing and causing as a consequence a restriction in the flow of the fluid in the tubing and a corresponding loading of the rocker arm.

5. A hot spot thermometer unit as in claim 4, wherein the heat sensitive element is formed of nylon plastics.

6. A hot spot thermometer unit as in claim 4, wherein the tubing is encased in a jacket so as to prevent expansion of the tubing as a consequence of rise in pressure of the fluid.

* * * * *